P. E. TARLTON.
AXLE OR SHAFTING GUARD.
APPLICATION FILED JULY 14, 1916.
1,227,342.
Patented May 22, 1917.
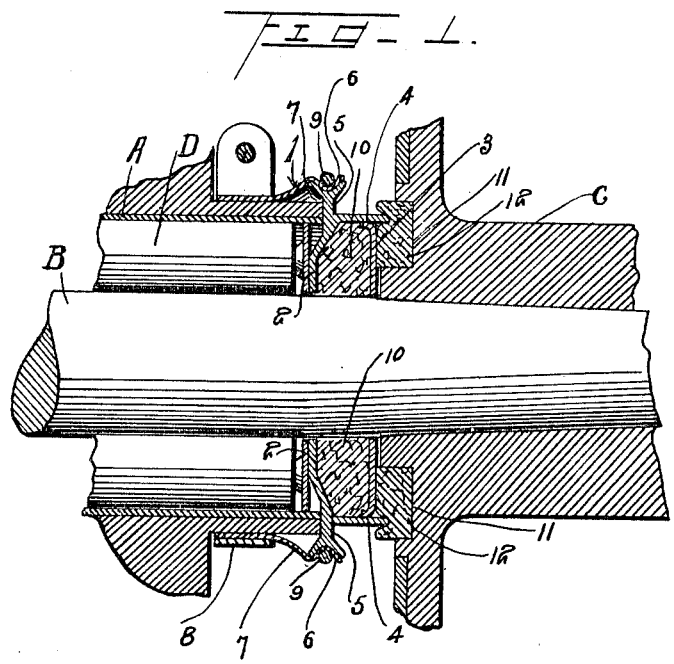
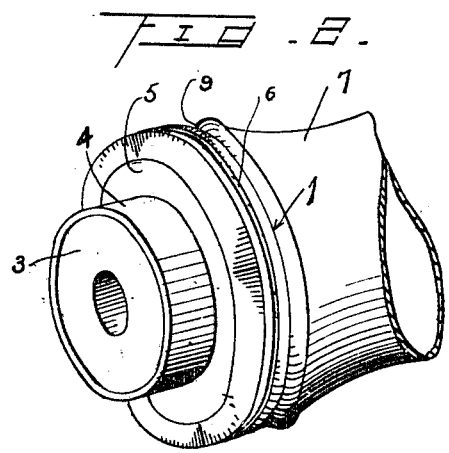
Witnesses
A. R. Stanton.
J. J. Donegan.
Inventor
P. E. Tarlton.
By
Attorney

UNITED STATES PATENT OFFICE.

PEARL E. TARLTON, OF LONG BEACH, CALIFORNIA.

AXLE OR SHAFTING GUARD.

1,227,342.   Specification of Letters Patent.   Patented May 22, 1917.

Application filed July 14, 1916. Serial No. 109,320.

*To all whom it may concern:*

Be it known that I, PEARL E. TARLTON, a citizen of the United States, residing at Long Beach, in the county of Los Angeles and State of California, have invented certain new and useful Improvements in Axle or Shafting Guards; and I do hereby declare the following to be a full, clear, and exact description of the invention, such as will enable others skilled in the art to which it appertains to make and use the same.

The primary object of this invention is to prevent the escape of lubricant from the ends of the axle casing of an automobile, and passing the packing that surrounds the axle and interposed between the ends of the casing and the hubs of the rear wheels.

A further object of the invention is to prevent any vertical and lateral motion of the axle, with respect to the casing, from loosening the packing from snug engagement with the axle.

Another object of the invention is the provision of simple, durable and efficient means for carrying out the above objects, and which can be conveniently associated with the axle casing.

Other objects will appear and be better understood from that embodiment of my invention of which the following is a specification, reference being had to the accompanying drawing forming a part thereof, in which:

Figure 1 is a detail longitudinal sectional view, taken through one end of the axle casing and the hub of the adjacent rear wheel of the vehicle, showing the invention associated therewith, and Fig. 2 is a perspective view of the invention detached from operative position.

Referring to the drawing in detail, the letter A designates one end of the casing for the rear axle of an automobile, or other vehicle, and B a portion of the axle which extends through the casing and has one end extended beyond the adjacent end of the casing for the accommodation of the hub C of the adjacent rear wheel, and the letter D designates the usual type of roller bearings mounted within the casing and engaging the axle.

As shown in Fig. 1 of the drawing, the end of the casing A is spaced from the hub C of the wheel, and interposed between the mentioned end of the axle and the hub is a cage 1, which consists of a cylindrical or cup-shaped body that encircles the axle and has the sides thereof arranged in spaced relation with the axle. The inner end of the cage is closed by means of a wall 2, which is formed integral with the inner end of the cage, and is concentrically provided with an opening for the passage of the axle, and the other end of the cage is closed by means of a removable disk 3, which, like the inner end wall 2 of the cage, is concentrically provided with an opening for the passage of the axle. The disk 3 fits within the outer end of the cage, and is provided with a peripheral flange 4, which frictionally engages the inner surface of the cage, so as to hold the disk in operative position. The cage 1 is provided with a circular flange 5, that is located at a point adjacent the inner end of the cage, and which flange is provided with a peripheral groove 6, the walls of which groove extend in outwardly diverging relation, as shown more particularly in Fig. 1 of the drawing.

A cylindrical body 7, formed preferably of leather, has one end fitted over the end of the axle casing and clamped thereon by means of a clamping band 8, and the opposite end of the body 7, which is of a diameter larger than the diameter of the first-mentioned end, is engaged over the flange 5 and pressed into the groove 6 and held therein by means of a clamping ring 9.

A packing body 10 of circular configuration, and formed of felt or other suitable material, is located within the cage and clamped between the inner wall 2 and the disk 3, and is provided with a central opening which receives the axle B, and the walls of the opening in the body 10 snugly engage the axle.

The inner face of the hub C is provided with an annular groove 11, which receives the circular body 12 formed of felt, or similar material, and the outer face of the body 12 engages against the adjacent end of the cage 1, and by virtue of this engagement the outer face of the body 12 is depressed at the point of contact with the end of the cage, as shown in Fig. 1, so as to form a tight joint between the body 12 and the adjacent end of the cage.

During rotation of the axle, the cage 1, disk 2, body 7 and packing 10 remain stationary, that is against rotation. When any lateral or vertical movement is imparted to the axle, due to any lost motion between the axle and the bearings D, resulting in similar movement being imparted to the wheel, the cage 1 will, by reason of the outer end of the cage being engaged in the outer surface of the body 12 in the manner shown in Fig. 1 of the drawing, have similar movement imparted thereto, so as to move the packing body 10 in the direction of movement of the axle, this movement of the cage being permitted by the flexible body 7. Such movement of the cage and the packing body 10, in the direction of movement of the axle, prevents the axle, when moved either in a vertical or lateral direction, from exerting strain on the walls of the opening in the packing body, thereby preventing the opening being made larger which would result in the escape of lubricant therethrough.

It will, of course, be understood that while the invention is shown applied only at one end of the casing A, this is for illustrative purposes only, as both ends of the casing will be equipped alike.

It is evident that various changes might be resorted to in the construction, form and arrangement of the several parts without departing from the spirit and scope of my invention, hence I do not wish to limit myself strictly to the structure herein described and claimed.

Having thus described my invention what I claim as new, is:

1. The combination with an axle and a casing therefor, and a wheel carried by the axle, of a hollow body located at one end of the casing and encircling the axle, a packing body secured within the hollow body and engaging the axle, and a flexible connection between the body and the casing, for the purpose specified.

2. The combination with an axle and a casing therefor and a wheel carried by the axle, of a hollow movable body located at one end of the casing and encircling the axle, a packing body secured within the hollow body and engaging the axle, and a body carried by the inner face of the hub of the wheel and formed of comparatively soft material and engaging the outer end of the hollow body, for the purpose specified.

3. The combination with an axle and a casing therefor, and a packing carrying hollow body encircling the axle and located at one end of the casing, of a circular flange carried by the body and having a groove, a flexible element having one end secured to the casing and its opposite end received by the groove in the flange, and a retaining ring fitted within the groove and engaging the adjacent end of the flexible element.

4. The combination with an axle and a casing therefor and a packing carrying body located at one end of the hollow body and surrounding the axle, of a hollow body formed of flexible material having one end connected to the packing carrying body and its opposite end receiving the adjacent end of the casing, and a clamping ring detachably connecting the hollow body to the casing.

5. The combination with an axle and a casing therefor, of a packing carrying hollow body encircling the axle and located at one end of the casing, a flange formed at one end of the hollow body and provided with a groove, a second hollow body formed of flexible material having one end secured to the casing and its opposite end engaging over the flange on the first-mentioned hollow body and extending into the groove in the flange, and fastening means positioned within the groove in the flange and engaging the adjacent end of the second mentioned hollow body.

6. The combination with an axle and a casing therefor, of a hollow movable body encircling the axle and carried by one end of the casing, packing located within the body and engaging the axle, a disk fitted within one end of the body and engaging the packing and provided with an opening for receiving the axle, and a peripheral flange formed on the disk and frictionally engaging the inner surface of the hollow body for securing the disk within the hollow body.

In testimony whereof I affix my signature in presence of two witnesses.

PEARL E. TARLTON.

Witnesses:
H. E. SMITH,
H. C. HORD.